April 1, 1947.    H. H. CORLEY    2,418,164
COUPLING FOR ELECTRIC WIRES
Filed June 12, 1945

Inventor
Harry H. Corley,
By McMorrow, Berman and Davidson
Attorneys

Patented Apr. 1, 1947

2,418,164

UNITED STATES PATENT OFFICE 2,418,164

COUPLING FOR ELECTRIC WIRES

Harry H. Corley, Humboldt, Ariz.

Application June 12, 1945, Serial No. 598,942

2 Claims. (Cl. 287—78)

The present invention relates to a coupling for electric wires and it has for its primary object to provide a simpler and more compact device than is provided in prior devices.

Another object is to provide a device with few parts which may be readily assembled.

A further object is to provide a coupling device which will act positively on the terminals of two electric wires to join them together and will prevent disconnection unless it be desired.

With these and other objects and advantages in view, the invention consists of the novel construction and arrangement of parts hereinafter described and claimed.

In the drawings illustrating the invention,

Similar numerals are employed to designate the same parts of construction in the several views of the drawings.

Figure 1:
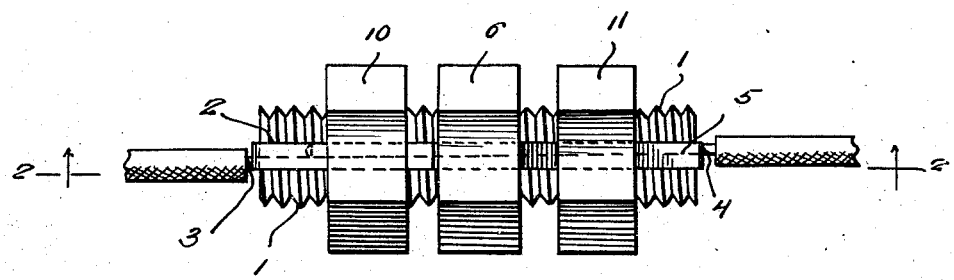
Figure 1 is a top plan view of the coupling applied to the joined ends of two electric wires.
Figure 2:
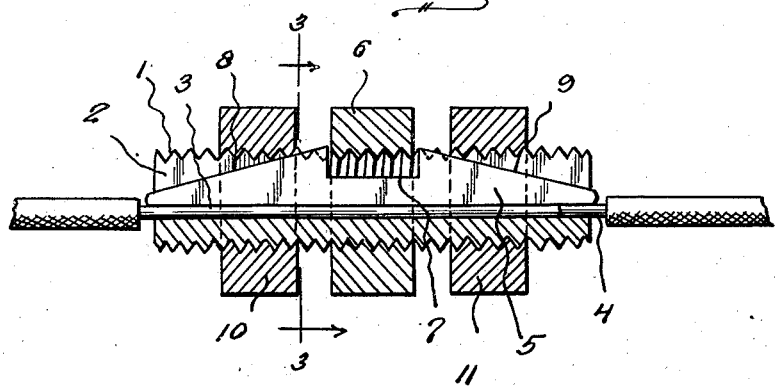
Figure 2 is a vertical, longitudinal sectional view on the line 2—2 of Figure 1.
Figure 3:
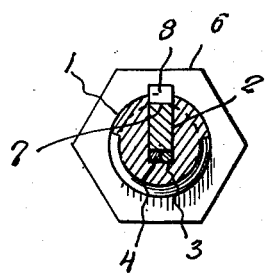
Figure 3 is a transverse sectional view on the line 3—3 of Figure 2.

1 represents an exteriorly threaded cylindrical member which is provided with a longitudinal groove 2 adapted to receive the overlapping ends of two electric wires, 3 and 4. Where the two wires are joined their insulation has been removed, thus exposing the metal and providing contact between them to produce a continuous conductor.

A clamping member 5 is normally contained in the groove of the cylindrical member 1 and retained in place by a nut 6 threaded onto the member 1 to a point approximately midway thereof. The clamping member 5 is constructed with a centrally-located, rectangular recess 7 and oppositely-inclined surfaces 8 and 9 along the upper edge. When not in use the lower straight edge of the clamping-member rests on the bottom of the groove 2 and the shoulders formed where the inclined surfaces of the upper edge join the recess 7 drop below the threads on the member 1. This allows the retaining nut 6 to be threaded onto member 1 to a point directly above the recess 7. When the ends of the two wires are inserted in the device they are passed underneath the clamping member thus raising the said member and causing its recess 7 to engage with the retaining nut 6. This results in a locking of the clamping member against any longitudinal movement.

The cylindrical member 1 is provided normally with two additional nuts 10 and 11 which are threaded onto said member from opposite directions. This positions one on each side of the center nut 6 and they are designed to be turned so as to move them inwardly towards the nut 6 for the purpose hereinafter disclosed. It will be understood that when the wires 3 and 4 are positioned in the groove and beneath the clamping-member 5 the result is not only to cause the center nut 6 to engage the recess 7 but to project a considerable portion of each of the inclined surfaces 8 and 9, of the clamping-member 5, outside of the threads on the cylindrical member 1.

In operation, the ends of the wires, to be joined, are passed into the groove of the cylindrical member and along the bottom thereof so as to overlap, after which the nuts 10 and 11 are turned towards the intermediate nut 6 until they engage with the projecting inclined surfaces 8 and 9 on the upper edge of the clamping-member 5. By tightening up on said nuts a downward pressure is exerted on the clamping-member, thus forcing its bottom edge against the overlapping ends of the two wires and firmly holding them in close contact. No displacement can occur until the nuts 10 and 11 are caused to disengage with the inclined surfaces of the upper edge of the clamping-member. If desired, the ends of the wires may be withdrawn from the coupling by merely loosening the said nuts 10 and 11.

Having thus described my invention what I claim as new and desire to secure by Letters Patent, is:

1. A coupling for electric wires, comprising an exteriorly-threaded, cylindrical member provided with a longitudinally-disposed groove adapted to contain the overlapped ends of two wires, a clamping-member disposed longitudinally in said groove and provided with a lower, straight edge parallel with the bottom of the groove, oppositely-inclined surfaces of the upper edges adapted to project above the groove, and a recess in the upper edge between said inclined surfaces, a retaining nut located on said cylindrical member and adapted to engage with said recess when the clamping-member is in operative position and adjusting nuts threaded on said cylindrical member and located on each side of said retaining nut and adapted to engage with the projecting, inclined edges of the clamping-member and exert pressure on the clamping-member on the overlapped ends of the wires.

2. In a coupling member for joining ends of wires and the like, a continuously threaded stud having a longitudinal slot in one side thereof, a clamping member disposed longitudinally of said slot, said clamping member having a transverse recess centrally positioned in one edge thereof and inclined surfaces on the edge in which the recess is positioned, and a plurality of nuts on said stud, one of said nuts adapted for registering with said recess and other nuts associated with the inclined surfaces for clamping action of the clamping member with wires between an edge thereof and the base of said slot.

HARRY H. CORLEY.

REFERENCES CITED

The following references are of record in the file of this patent:

UNITED STATES PATENTS

| Number | Name | Date |
|---|---|---|
| 2,032,394 | Becker, Sr. et al. | Mar. 3, 1936 |
| 1,751,572 | Beemer | Mar. 25, 1930 |